United States Patent
Sekijima

(10) Patent No.: US 10,274,962 B2
(45) Date of Patent: Apr. 30, 2019

(54) VEHICLE TRAVELING CONTROL APPARATUS

(71) Applicant: FUJI JUKOGYO KABUSHIKI KAISHA, Tokyo (JP)

(72) Inventor: Yasuhiro Sekijima, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 200 days.

(21) Appl. No.: 15/402,553

(22) Filed: Jan. 10, 2017

(65) Prior Publication Data

US 2017/0235311 A1    Aug. 17, 2017

(30) Foreign Application Priority Data

Feb. 15, 2016   (JP) .................. 2016-026081

(51) Int. Cl.
*B60W 30/02*   (2012.01)
*B60W 50/08*   (2012.01)
(Continued)

(52) U.S. Cl.
CPC ........... *G05D 1/0219* (2013.01); *B60W 10/06* (2013.01); *B60W 10/184* (2013.01);
(Continued)

(58) Field of Classification Search
CPC ............... G05D 1/0219; G05D 1/0223; G05D 2201/0213; B60W 10/20; B60W 40/08;
(Continued)

(56) References Cited

U.S. PATENT DOCUMENTS

2017/0123434 A1*  5/2017  Urano .................... B60Q 9/008

FOREIGN PATENT DOCUMENTS

JP    2006-137392      6/2006
JP    2006-219032 A    8/2006
(Continued)

OTHER PUBLICATIONS

Machine translation of JP 2006-347508 (Year: 2006).*
(Continued)

*Primary Examiner* — Alan D Hutchinson
(74) *Attorney, Agent, or Firm* — Smith, Gambrell & Russell, LLP

(57) ABSTRACT

A vehicle traveling control apparatus that performs an automatic driving control based on traveling environment information and traveling information includes a steering holding state detector, a target parameter setting unit, a target parameter correcting unit, and an acceleration and deceleration controller. The steering holding state detector detects a steering wheel holding state of a driver. The target parameter setting unit recognizes a curve ahead of the own vehicle based on the traveling environment information. The target parameter setting unit sets a target parameter that is based on one or both of a target vehicle speed and an allowable lateral acceleration rate of the own vehicle in passing through the curve. The target parameter correcting unit corrects the target parameter depending on the steering wheel holding state. The acceleration and deceleration controller sets a target acceleration rate of the own vehicle based on the target parameter, and controls acceleration and deceleration.

4 Claims, 4 Drawing Sheets

(51) Int. Cl.
*G05D 1/02* (2006.01)
*B60W 10/06* (2006.01)
*B60W 10/184* (2012.01)
*B60W 10/20* (2006.01)
*B60W 30/09* (2012.01)
*B60W 30/18* (2012.01)
*B60W 40/08* (2012.01)
*B60W 50/12* (2012.01)
*B60W 50/14* (2012.01)
*G08G 1/16* (2006.01)
*G08G 1/0968* (2006.01)

(52) U.S. Cl.
CPC ............ *B60W 10/20* (2013.01); *B60W 30/09* (2013.01); *B60W 30/18145* (2013.01); *B60W 40/08* (2013.01); *B60W 50/12* (2013.01); *B60W 50/14* (2013.01); *G05D 1/0223* (2013.01); *G08G 1/16* (2013.01); *B60W 2050/146* (2013.01); *B60W 2420/42* (2013.01); *B60W 2420/52* (2013.01); *B60W 2540/00* (2013.01); *B60W 2550/10* (2013.01); *B60W 2550/146* (2013.01); *B60W 2600/00* (2013.01); *B60W 2720/10* (2013.01); *B60W 2720/106* (2013.01); *B60W 2720/125* (2013.01); *G05D 2201/0213* (2013.01); *G08G 1/096827* (2013.01); *G08G 1/096872* (2013.01)

(58) Field of Classification Search
CPC ............... B60W 10/184; B60W 50/12; B60W 30/18145; B60W 50/14; B60W 30/09; B60W 10/06; B60W 2720/125; B60W 2720/10; B60W 2420/42; B60W 2050/146; B60W 2720/106; B60W 2540/00; B60W 2550/10; B60W 2600/00; B60W 2550/146; B60W 2420/52; G08G 1/16; G08G 1/096827; G08G 1/096872
See application file for complete search history.

(56) References Cited

FOREIGN PATENT DOCUMENTS

| | | |
|---|---|---|
| JP | 2006-347508 A | 12/2006 |
| JP | 2010-030443 A | 2/2010 |
| JP | 2010-030544 | 2/2010 |
| JP | 2012-040914 | 3/2012 |
| JP | 2013-090834 | 5/2013 |

OTHER PUBLICATIONS

Japanese Office Action dated Jan. 23, 2018, in Japanese Patent Application No. 2016-026081 (8 pages—Japanese with English machine translation).

First Japanese Office Action dated Jul. 4, 2017, in Japanese Patent Application No. 2016-026081 (8 pages—Japanese with English machine translation).

* cited by examiner

VEHICLE TRAVELING CONTROL APPARATUS

CROSS-REFERENCE TO RELATED APPLICATIONS

The present application claims priority from Japanese Patent Application No. 2016-026081 filed on Feb. 15, 2016, the entire contents of which are hereby incorporated by reference.

BACKGROUND

The technology relates to a vehicle traveling control apparatus that controls, for example, traveling in a curve in a drive assist control and an automatic driving control.

Various techniques utilizing a control such as a drive assist control and an automatic drive control have been developed and put into practical use, in order for a driver to drive a vehicle more comfortably. For example, Japanese Unexamined Patent Application Publication (JP-A) No. 2010-30544 discloses a technique of a vehicle automatic driving control that keeps a deceleration control when an own vehicle is presumed not to keep decelerating until reaching a curve, even in a case of satisfying; a condition of deactivating an automatic driving control. The automatic driving control controls the own vehicle to accelerate and decelerate, and controls the own vehicle to travel at a target vehicle speed that enables traveling in a curve at least before entering the curve.

SUMMARY

In some cases, a traveling feel of a driver in a case where the driver holds a steering wheel directly (including cases of a manual driving, a drive assist control, and an automatic driving control) may be different from a traveling feel of a driver in a case where the driver does not hold (the driver takes his or her hands off) the steering wheel during the automatic driving control as disclosed in the JP-A No. 2010-10544. Due to the difference in the traveling feels, the driver may end up in feeling a sense of anxiety.

It is desirable to provide a vehicle traveling control apparatus that enables a driver to feel less sense of anxiety in traveling in a curve.

An aspect of the technology provides a vehicle traveling control apparatus that performs an automatic driving control on a basis of traveling environment information and traveling information of the own vehicle. The traveling environment information is information on a traveling environment in which an own vehicle travels. The vehicle traveling control apparatus includes a traveling environment information obtaining unit that obtains the traveling environment information, a traveling information detector that detects the traveling information of the own vehicle, a steering holding state detector that detects a steering wheel holding state of a driver, a target parameter setting unit that recognizes a curve to be traveled ahead of the own vehicle on the basis of the traveling environment information, and sets a target parameter that is based on one or both of a target vehicle speed and allowable lateral acceleration of the own vehicle in passing through the curve ahead of the own vehicle, a target parameter correcting unit that corrects the target parameter set by the target parameter setting unit depending on the steering wheel holding state of the driver, and an acceleration and deceleration controller that sets a target acceleration rate of the own vehicle on a basis of the corrected target parameter and controls acceleration and deceleration.

Another aspect of the present invention provides a vehicle traveling control apparatus including a steering holding state detector, a target parameter setting unit, a target parameter correcting unit and a an acceleration and deceleration controller. The steering holding state detector detects a steering wheel holding state of a driver, on a condition that the vehicle traveling control apparatus performs, to an own vehicle, an automatic driving control on a basis of traveling environment information on a traveling environment in which the own vehicle travels and raveling information of the own vehicle. The target parameter setting unit recognizes a curve to be traveled ahead of the own vehicle on a basis of the traveling environment information, and sets a target parameter that is based on one or both of a target vehicle speed and allowable lateral acceleration rate of the own vehicle in passing through the curve ahead of the own vehicle. The target parameter correcting unit corrects the target parameter set by the target parameter setting unit depending on the steering wheel holding state of the driver. The acceleration and deceleration controller sets a target acceleration rate of the own vehicle on a basis of the corrected target parameter and controls acceleration and deceleration.

DETAILED DESCRIPTION

In the following, some implementations of the technology are described with reference to the accompanying drawings.

Figure 1:
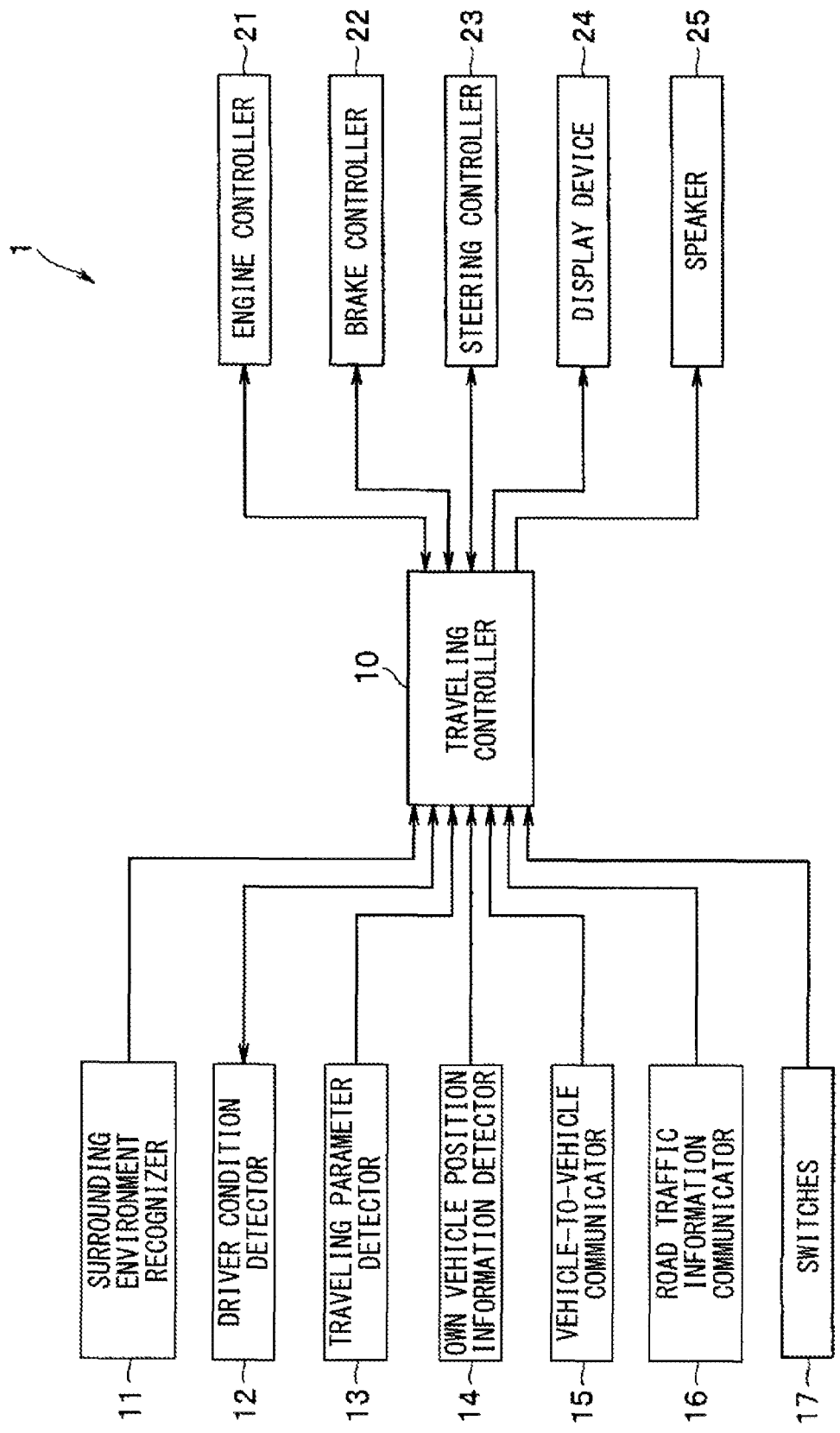
FIG. 1 illustrates an overall configuration of a vehicle traveling control apparatus according to an implementation of the technology.

Referring to FIG. 1, a vehicle traveling control apparatus 1 includes a traveling controller 10. To the traveling controller 10, as input devices, a surrounding environment recognizer 11, a driver condition detector 12, a traveling parameter detector 13, an own vehicle position information detector 14, a vehicle-to-vehicle communicator 15, a road traffic information communicator 16, and switches 17 may be coupled. To the traveling controller 10, as output devices, an engine controller 21, a brake controller 22, a steering controller 23, a display device 24, and a speaker 25 may be coupled. The speaker 25 as used herein encompasses a buzzer.

The surrounding environment recognizer 11 may include a camera and a reflected wave receiver which are unillustrated. The camera may have a solid-state imaging element, or other elements. The camera may be provided in a vehicle interior, and may capture an image of an environment outside a vehicle to obtain image information. The camera may be, for example but not limited to, a stereo camera, a monocular camera, or a color camera. The reflected wave receiver may be one or both of, for example but not limited to, a radar and a sonar. The radar and the sonar each may receive a reflected wave derived from a three-dimensional object present around the vehicle. The radar may be, for example but not limited to, a laser radar or a millimeter-wave radar.

On the basis of image information captured by the camera, the surrounding environment recognizer 11 may perform, for example, a grouping processing on distance information, and may compare the distance information having been subjected to the grouping processing with data such as three-dimensional road shape data and three-dimensional object data that are set in advance to extract lane line data, side-wall data on a guardrail, and a curb present along the road, and data on three-dimensional objects such as a vehicle including a preceding vehicle, an oncoming vehicle, a vehicle running parallel to the own vehicle, and a parked vehicle. The surrounding environment recognizer 11 may extract the pieces of data, together with a position relative to the own vehicle and a speed. The relative position may include, for example but not limited to, a distance and an angle.

The surrounding environment recognizer 11 may detect the position of a reflected three-dimensional object (distance and angle) together with a speed on the basis of information on a reflected wave obtained by a radar. In one implementation, the surrounding environment recognizer 11 may serve as a traveling environment information obtaining unit.

The driver condition detector 12 may be a steering wheel bio-detection sensor that detects a bio-signal of a driver provided on a steering wheel. One example of the bio-detection sensor is disclosed in Japanese Unexamined Patent Application Publication No. 2013-90834. In the implementation of the technology, the steering wheel bio-detection sensor may detect the steering wheel holding state of the driver. In other words, the driver condition detector 12 may serve as a steering holding state detector.

The traveling parameter detector 13 may detect traveling information of the own vehicle. Specific examples of the traveling information may include factors such as, but not limited to, a vehicle speed, forward and backward acceleration, lateral acceleration, a steering wheel angle, a steering torque, a yaw rate, an acceleration position, a throttle opening angle, a gradient of a road surface on which the own vehicle travels, and an estimate value on a friction coefficient of the road surface. In one implementation, the traveling parameter detector 13 may serve as a traveling information detector.

The own vehicle position information detector 14 may be, for example but not limited to, a navigation system. The own vehicle position information detector 14 may receive an electric wave sent from, for example but not limited to, a global positioning system (GPS), and detect a current position, on the basis of information on the received electric wave. By detecting the current position, the own vehicle position information detector 14 may identify a position of the own vehicle on map data. The map data may be stored in advance on a recording medium such as, but not limited to, a flash memory, a compact disc (CD), a digital versatile disc (DVD), a Blu-ray (Registered Trademark) disc, and a hard disk drive (HDD).

The map data stored in advance may include road data and facility data. The road data may include, for example but not limited to, information on positions of links, information on types of the links, information on positions of nodes, information on types of the nodes, information on curvature of curves (or radius of curves) in the nodes, and information on a relationship in connection between the nodes and the links. In other words, the road data may include information on branching and a junction of a road, information on a maximum vehicle speed at a branch road, and any other information. The facility data may include a plurality of records for each facility. The records each may include data that indicates, for example but not limited to, information on name of a relevant facility, information on a location of the facility, and information on a type of the facility which may be classified into a department store, a store, a restaurant, a parking lot, a park, and a place for repairing upon a vehicle malfunction. The own vehicle position information detector 14 may display the position of the own vehicle on the map, and allow an operator to input a destination. Upon the input of the destination, the own vehicle position information detector 14 may perform a predetermined calculation on a route from the place of departure to the destination. The own vehicle position information detector 14 may display the calculated route on the display device 24 such as, but not limited to, a display and a monitor, and may guide the driver by voice by means of the speaker 25 to allow for full command of guidance. In one implementation, the own vehicle position information detector 14 may serve as the traveling environment information obtaining unit.

The vehicle-to-vehicle communicator 15 may be a short-range wireless communicator that may have a communication area of about 100 m such as, but not limited to, a wireless local area network (LAN). The vehicle-to-vehicle communicator 15 may perform communication with any other vehicle directly without any intervention of a server, or other means to transmit and receive information. The vehicle-to-vehicle communicator 15 may exchange information such as, but not limited to, vehicle information, traveling information, and traffic environment information with any other vehicle through the mutual communication with that vehicle. The vehicle information may include, for example but not limited to, unique information that indicates a type of a vehicle such as, but not limited to, a passenger car, a truck, and a motorcycle in one implementation. The traveling information may include, for example but not limited to, vehicle speed information, position information, information on lighting of a stop lamp, information on blinking of a blinker that is signaled upon right turn and left turn, and information on blinking of hazard lights upon emergency stop. The traffic environment information may include information subjected to change from situation to situation such as, but not limited to, information on traffic jam and information on construction. In one implementation, the vehicle-to-vehicle communicator 15 may serve as the traveling environment information obtaining unit.

The road traffic information communicator 16 may be a so-called vehicle information and communication system (VICS: Registered Trademark) or any other suitable system that receives information on road traffic. The road traffic information communicator 16 may receive the road traffic information on a real-time basis through an FM multiplex broadcast or from a transmitter on a road, and display the received road traffic information on the previously-stored map data described above. The road traffic information may include information on, for example but not limited to, traffic jam, accident, construction, required time, and parking lot. In one implementation, the road traffic information communicator 16 may serve as the traveling environment information obtaining unit.

The switches 17 may be those related to a drive assist control for a driver. Non-limiting examples of the switches 17 may include: a switch that performs a constant speed traveling control in which a speed is set to a previously-set constant speed; a switch that performs a follow-up control in which an inter-vehicle distance or inter-vehicle time between the own vehicle and the preceding vehicle is kept to a previously-set constant value; a switch that performs a lane-keeping control in which a traveling lane is kept to a set lane to carry out a traveling control; a switch that performs a control which prevents an occurrence of deviation from the traveling lane; a switch that allows for execution of an overtaking control which overtakes the preceding vehicle or a vehicle to be overtaken; a switch that executes an automatic driving control which causes some or all of the controls described above to be performed in a coordinated manner; a switch that sets factors necessary for each of the controls described above, including a vehicle speed, an inter-vehicle distance, inter-vehicle time, and a speed limit without limitation; and a switch that deactivates any or all of the controls described above.

The engine controller 21 may perform a principal control related to an unillustrated engine of the vehicle, on the basis of the vehicle information. The principal control may include, for example but not limited to, a fuel injection control, an ignition timing control, and an electronic throttle control. The vehicle information may be directed to, for example hut not limited to, an intake airflow, a throttle opening angle, an engine water temperature, an intake temperature, a concentration of oxygen, a crank angle, and an accelerator position. When the engine controller 21 receives acceleration rate necessary (required acceleration rate) for each of the above-described automatic driving controls from the traveling controller 10 during the automatic driving, the engine controller 21 may calculate a driving torque (automatic driving requirement torque) on the basis of the required acceleration rate to perform the engine control using the automatic driving requirement torque as a target torque. Non-limiting examples of the automatic driving controls may include a control to prevent collision with an object such as an obstacle, the constant speed traveling control, the follow-up traveling control, the lane-keeping control, the lane deviation prevention control, and the overtaking control.

The brake controller 22 may allow for a control of unillustrated brake devices of four wheels independently of a braking operation performed by the driver, and may perform an antilock brake system (ABS) control and a yaw brake control that controls a yaw moment applied to the vehicle. The brake controller 22 may perform these controls, on the basis of the vehicle information that may be directed to, for example but not limited to, a brake switch, wheel speed of each of the four wheels, the steering wheel angle, and the yaw rate. The yaw brake control may include, for example but not limited to, an antiskid control. Upon receiving deceleration necessary (required deceleration) for each of the above-described automatic driving controls from the traveling controller 10 during the automatic driving, the brake controller 22 may set a target fluid pressure of a wheel cylinder of a brake of each wheel on the basis of the required deceleration to perform the brake control. Non-limiting examples of the automatic driving controls may include the control to prevent collision with an object such as an obstacle, the constant speed traveling control, the follow-up traveling control, the lane-keeping control, the lane deviation prevention control, and the overtaking control.

The steering controller 23 may control assist torque derived from an unillustrated electric power steering motor provided in a steering system of the vehicle, on the basis of the vehicle information that may be directed to, for example but not limited to, the vehicle speed, the steering torque, the steering wheel angle, and the yaw rate. The steering controller 23 may allow for the lane-keeping control in which the traveling lane is kept to a set lane to carry out the traveling control, the lane deviation prevention control that prevents the occurrence of deviation from the traveling lane, and an automatic driving steering control that carries out these controls in a coordinated manner. The steering controller 23 may receive, from the traveling controller 10, information on the steering wheel angle, the target steering wheel angle, or the steering torque necessary for the lane-keeping control, the lane deviation prevention control, and the automatic driving steering control calculated by the traveling controller 10, and may control driving of the electric power steering motor, on the basis of a control amount of the steering wheel angle or the steering torque received from the traveling controller 10.

The display device 24 may provide the driver with visual alerting or visual notification, by means of, for example hut not limited to, the monitor, the display, or an alarm lamp. The speaker 25 may provide the driver with aural alerting or aural notification.

The traveling controller 10 may carry out, on the basis of each input signal from the surrounding environment recognizer 11, the driver condition detector 12, the traveling parameter detector 13, the own vehicle position information detector 14, the vehicle-to-vehicle communicator 15, the road traffic information communicator 16, and the switches 17, the control to prevent collision with an object such as an obstacle, the constant speed traveling control, the follow-up traveling control, the lane-keeping control, the lane deviation prevention control, the overtaking control, and other controls in a coordinated manner to perform vehicle controls such as the automatic driving control. During the automatic driving control, the traveling controller 10 recognizes a curve to be traveled ahead of the own vehicle. The traveling controller 10 sets a target vehicle speed of the own vehicle in passing through the curve ahead of the own vehicle. The traveling controller 10 corrects a target parameter that is set depending on the steering wheel holding state of the driver. In the present implementation of the technology, the target parameter is a target vehicle speed. The steering wheel holding state of the driver may be detected by the driver condition detector 12. The traveling controller 10 may set a target acceleration rate of the own vehicle on the basis of the corrected target parameter. The traveling controller 10 may calculate required acceleration or required deceleration rate on the basis of the target acceleration rate. The traveling controller 10 may output the calculated required acceleration rate or required deceleration rate to the engine controller 21 or the brake controller 22 to control acceleration and deceleration. In one implementation, the traveling controller 10 may be provided to have functions of a target parameter setting unit, a target parameter correcting unit, and an acceleration and deceleration controller.

Figure 2:
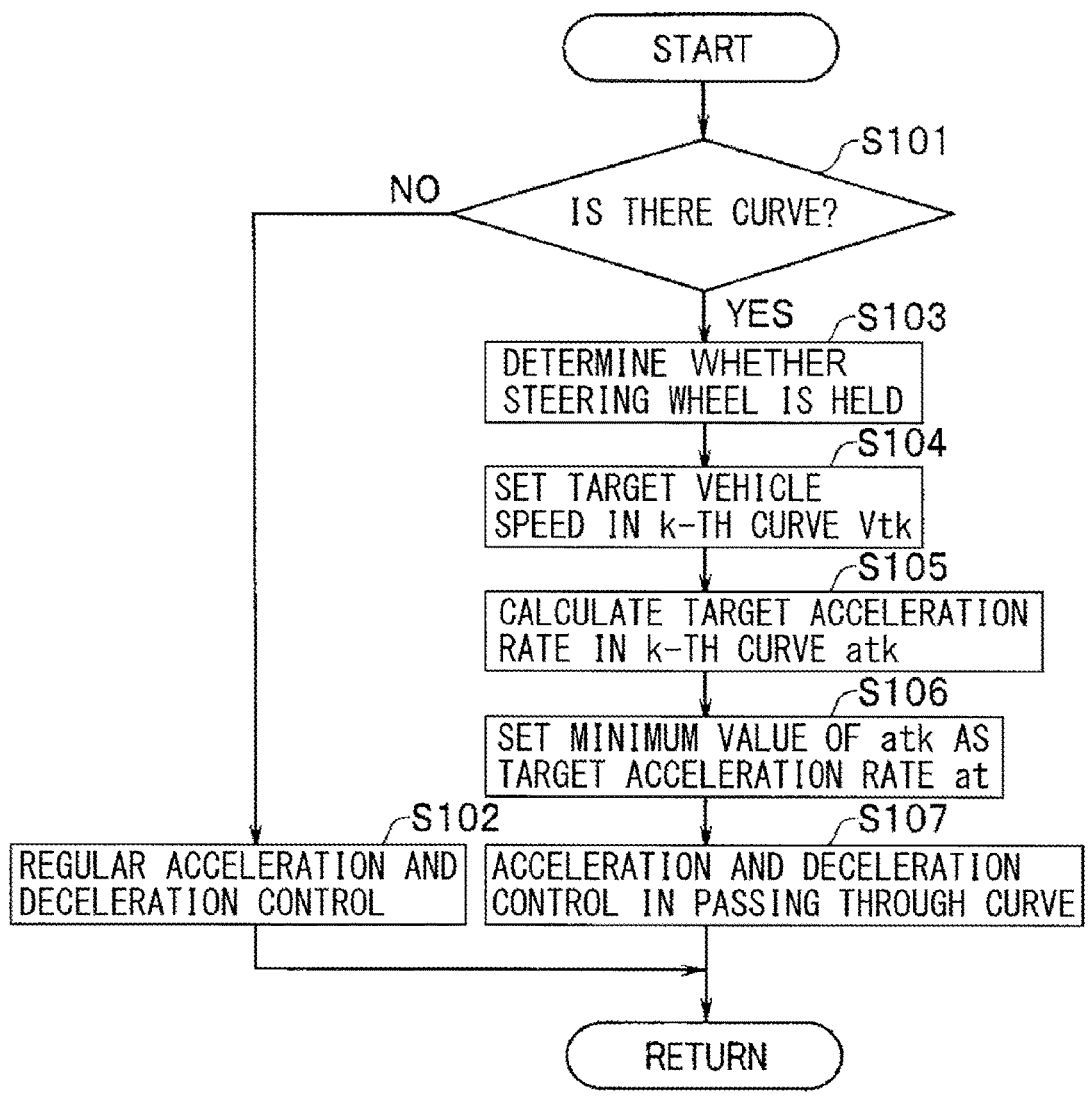
FIG. 2 is a flowchart of an example of an automatic driving control (acceleration and deceleration control) program according to the implementation of the technology.

A description is given next, with reference to the flowchart in FIG. 2, of an example of a program of the automatic driving control (acceleration and deceleration control) to be executed by the traveling controller 10.

First, in step (hereinafter, abbreviated as "S") 101, determination may be made as to whether there is a curve in a preset distance in an advancing route ahead of the own vehicle. It is to be noted that the advancing route ahead of the own vehicle may be acquired from lane information and a guided route. The lane information may be obtained by the image information derived from the surrounding environment recognizer 11. The guided route may be set on the map data of the navigation system of the own vehicle position information detector 14.

When determination is made that there is no curve ahead of the own vehicle as a result of the determination made in S101, the flow may proceed to S102. In S102, a regular control for acceleration and deceleration may be performed. In other words, required acceleration rate and deceleration rate necessary for each of the above-described automatic driving controls may be calculated, and the calculated required acceleration rate and deceleration rate may be outputted to the engine controller 21 or the brake controller 22 to perform the acceleration and deceleration control. Non-limiting examples of the automatic driving controls may include the control to prevent collision with an object such as an obstacle, the constant speed traveling control, the follow-up traveling control, the lane-keeping control, the lane deviation prevention control, and the overtaking control.

When determination is made that there is a curve ahead of the own vehicle as a result of the determination made in S101, the flow may proceed to S103. In S103, determination may be made as to the steering wheel holding state of the driver, which may be detected by the driver condition detector 12. In the present implementation of the technology, the steering wheel holding state of the driver may be determined with the steering wheel bio-detection sensor as the driver condition detector 12. However, the steering wheel holding state of the driver may also be determined by an absolute value of the steering torque. In this case, when the absolute value of the steering torque is equal to or greater than a preset value, the driver condition detector 12 may determine that the driver holds the steering wheel. When the absolute value of the steering torque is lower than the preset value, the driver condition detector 12 may determine that the driver does not hold (the driver takes his or her hands off) the steering wheel.

Thereafter, the flow may proceed to S104. In S104, for all the curves detected in S101 (in one implementation of the technology, the detected curves may be numbered as 1, 2, 3, . . . and k) and present ahead of the own vehicle, a target vehicle speed Vtk in a k-th curve ahead of the own vehicle may be set in order on the basis of closeness to the own vehicle. The target vehicle speed Vtk in the curve may be set in consideration of the steering wheel holding state determined in S103, for example, by referring to a characteristic diagram illustrated in FIG. 3, which is set previously by means of a calculation, an experiment, or other means depending on a turning radius ρ of the curve.

Figure 3:
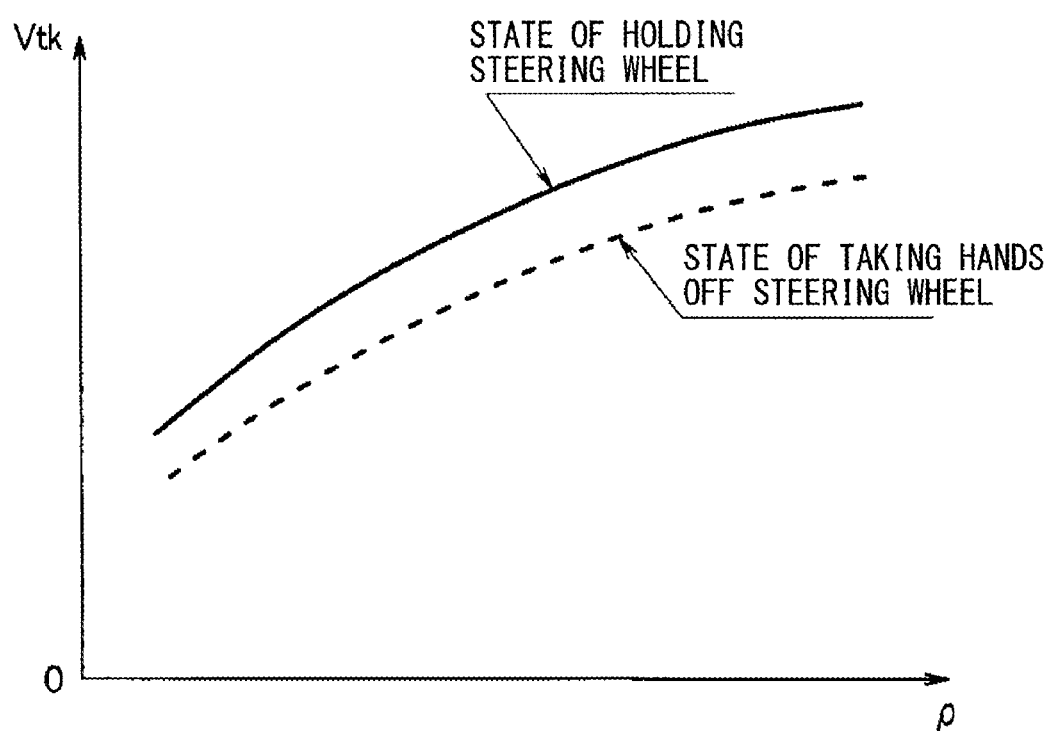
FIG. 3 describes a characteristic of a target vehicle speed that is set depending on a radius of a curve, according to the implementation of the technology.

As for the target vehicle speed Vtk in the curve, as appreciated also from the characteristic diagram in FIG. 3, a value of the target vehicle speed Vtk in the curve when the driver does not hold (the driver takes his or her hands off) the steering wheel (indicated by a broken line in FIG. 3) may be set lower than a value of the target vehicle speed Vtk when the driver holds the steering wheel (indicated by a solid line in FIG. 3).

This is because of the following reason. That is, even though a vehicle speed set by the driver in traveling in a curve when the driver holds the steering wheel directly is equal to a target vehicle speed in traveling in a curve set during the automatic driving control during which the driver does not hold (the driver takes his or her hands off) the steering wheel, the driver in the automatic driving control may end up in feeling a sense of anxiety, as the driver feels faster. Therefore, the value of the target vehicle speed Vtk in the curve when the driver does not hold (the driver takes his or her hands off) the steering wheel (indicated by the broken line in FIG. 3) may be set lower than a value under regular situation (the driver holding the steering wheel; indicated by the solid line in FIG. 3), thereby allowing the driver to feel less sense of anxiety when traveling in the curve.

When the target vehicle speed Vtk in the curve is obtained from the map data of the navigation system of the own vehicle position information detector 14, the target vehicle speed Vtk in the curve obtained from the map data may be set as a target vehicle speed when the driver holds the steering wheel directly. The target vehicle speed Vtk may be subjected to decrease correction to calculate a value of the target vehicle speed in traveling in the curve when the driver does not hold (the driver takes his or her hands off) the steering wheel. The decrease correction may include, for example but not limited to, multiplying a numerical value smaller than 1.0 or subtracting a set speed value. Alternatively, the turning radius ρ may be determined for the target vehicle speed Vtk in the curve obtained from the map data on the basis of the characteristic diagram in FIG. 3 to set the value of the target vehicle speed Vtk in the curve when the driver does not hold (the driver takes his or her hands off) the steering wheel in the turning radius ρ.

After setting the target vehicle speed Vtk for all the curves in S104, the flow may proceed to S105. In S105, a target acceleration rate atk may be calculated for all the curves, on the basis of the following expression (1), for example.

$$atk=(Vtk^2-V^2)/(2 \cdot s) \quad (1)$$

where V denotes a current vehicle speed, and "s" denotes a distance to an entry to a k-th curve.

Figure 4:
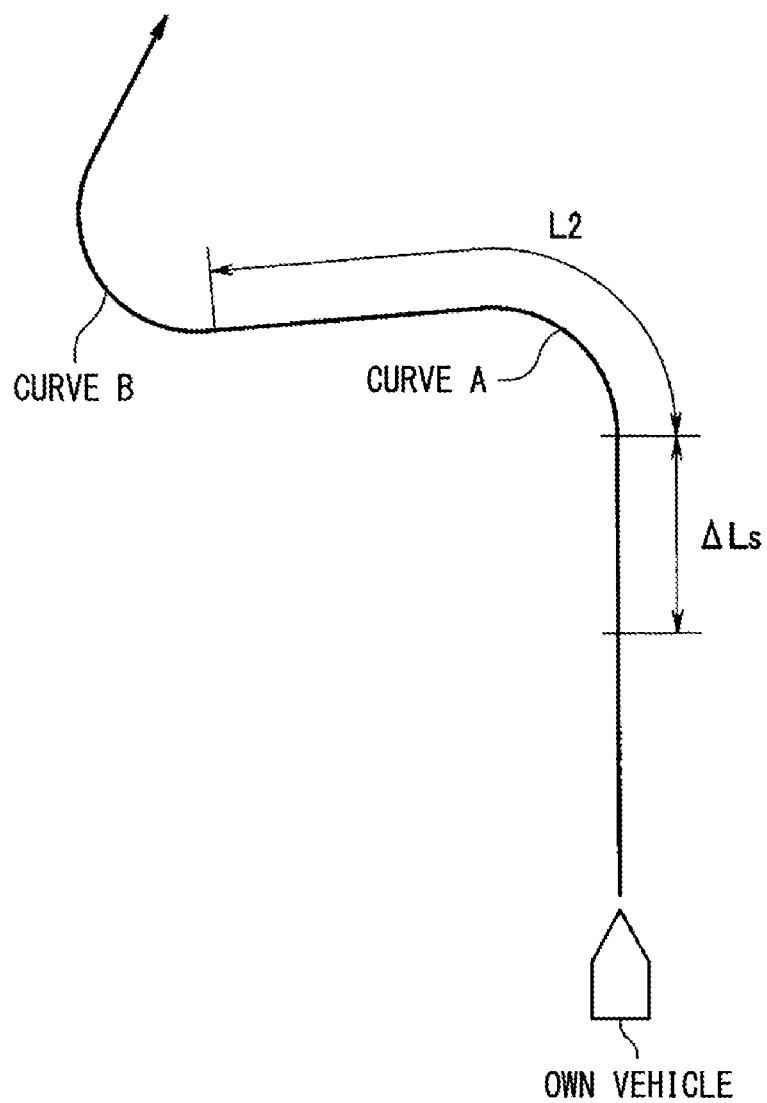
FIG. 4 describes an example of an own vehicle that travels in curves ahead of the own vehicle, according to the implementation of the technology.

As for the distance "s" from the entry to the curve, a control starting distance ΔLs previously obtained by means of an experiment, a calculation, or other means may be set for a first curve where k=1 (see a curve A in FIG. 4). When the current position of the own vehicle is closer to the entry to the curve than the control starting distance ΔLs, the distance "s" may be set to a distance from the current position to the entry to the curve. In this case, the distance "s" is closer to the entry to the curve than the control starting distance ΔLs. Thus, the acceleration and deceleration control may be performed immediately. The control starting distance ΔLs may be variable depending on the steering wheel holding state of the driver. When the driver does not hold (the driver takes his or her hands off) the steering wheel, the control starting distance may be set to a distance longer than that in a case where the driver holds the steering wheel. Thus, when the driver does not hold (the driver takes his or her hands off) the steering wheel, the acceleration and deceleration control may be performed at acceleration rate or deceleration rate more moderate than that in the case where the driver holds the steering wheel, thus allowing the driver to feel less sense of anxiety. Further, a distance to an entry to a second curve or a curve thereafter (see a curve B in FIG. 4) may have a value of the sum of the above-described control starting distance ΔLs and a distance to the entry to the curve from the entry to the previous curve (s=ΔLs+L2 in FIG. 4).

Next, the flow may proceed to S106, in which a minimum value of the target acceleration rate atk for all the curves calculated in S105 may be extracted to set the minimum value as a target acceleration rate at.

Thereafter, the flow may proceed to S107. In S107, required acceleration rate and deceleration rate necessary for each of the foregoing automatic driving controls may be calculated on the basis of the target acceleration rate at, and the calculated required acceleration rate and deceleration rate may be outputted to the engine controller 21 or the brake controller 22 to perform the acceleration and deceleration control. Non-limiting examples of the automatic driving controls may include the control to prevent collision with an object such as an obstacle, the constant speed traveling control, the follow-up traveling control, the lane-keeping control, the lane deviation prevention control, and the overtaking control.

In the present implementation of the technology, the value of the target vehicle speed Vtk in passing through the curve when the driver does not hold (the driver takes his or her hands off) the steering wheel may be controlled to be set lower than the value obtained when the driver holds the steering wheel. However, one implementation of the technology may also be applied to a technique of setting allowable lateral acceleration rate in passing through the curve.

In this case, the allowable lateral acceleration rate ay in passing through the curve may be calculated by the following expression (2):

$$ay = \mu \cdot Kus \cdot g \qquad (2)$$

where μ denotes an estimate value on a friction coefficient of the road surface, Kus denotes a factor of safety (0.5 to 1.0) previously set by means of an experiment, a calculation, or other means, and g denotes gravity acceleration rate.

An allowable speed Va in the curve may be calculated, for example, by the following expression (3).

$$Va = (\rho \cdot ay)^{1/2} \qquad (3)$$

Therefore, the allowable lateral acceleration rate ay when the driver holds the steering wheel may be a value determined by the foregoing expression (2). The allowable lateral acceleration rate ay when the driver does not hold (the driver takes his or her hands off) the steering wheel may be a value determined by the following expression (4), with a value less than 1 being which is previously set by means of an experiment, a calculation, or other means.

$$ay = \lambda \cdot \mu \cdot Kus \cdot g \qquad (4)$$

Thus, the allowable lateral acceleration rate ay in passing through the curve when the driver does not hold (the driver takes his or her hands off) the steering wheel may be controlled to be set lower than a value obtained when the driver holds the steering wheel.

As for other methods of determining the target vehicle speed using both the vehicle speed and the allowable lateral acceleration rate, the target vehicle speed in passing through the curve may also be determined by limiting the target speed determined by the characteristic diagram in FIG. 3 with the allowable speed Va calculated by the foregoing expression (3).

On the basis of the foregoing implementation of the technology, during the automatic driving control, when a curve to be traveled ahead of the own vehicle is recognized, and when it is detected that the driver does not hold the steering wheel, target vehicle speed and the allowable lateral acceleration rate may be corrected to values lower than the target vehicle speed and the allowable lateral acceleration rate to be set on a condition that the driver holds the steering wheel. On the basis of the corrected target vehicle speed and allowable lateral acceleration rate, the target acceleration rate of the own vehicle may be set to control the acceleration and the deceleration. Thus, it is possible to achieve excellent effects such as having the same traveling feel, in traveling in a curve, both in a case where the driver directly holds the steering wheel (including cases of a manual driving, a drive assist control, and an automatic driving), and in a case where the driver does not hold (the driver takes his or her hands off) the steering wheel during the automatic driving, resulting in enabling the driver to feel less sense of anxiety when traveling in the curve.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle traveling control apparatus that performs an automatic driving control on a basis of traveling environment information and traveling information of an own vehicle, the traveling environment information being information on a traveling environment in which the own vehicle travels, the vehicle traveling control apparatus comprising:
    a traveling environment information obtaining unit that obtains the traveling environment information;
    a traveling information detector that detects the traveling information of the own vehicle;
    a steering holding state detector that detects a steering wheel holding state of a driver;
    a target parameter setting unit that recognizes a curve to be traveled ahead of the own vehicle on a basis of the traveling environment information, and sets a target parameter that is one or both of a target vehicle speed and allowable lateral acceleration rate of the own vehicle in passing through the curve ahead of the own vehicle;
    a target parameter correcting unit that corrects the target parameter set by the target parameter setting unit depending on the steering wheel holding state of the driver; and
    an acceleration and deceleration controller that sets a target acceleration rate of the own vehicle on a basis of the corrected target parameter and controls acceleration and deceleration, and
    wherein, when a plurality of curves to be traveled ahead of the own vehicle are recognized on the basis of the traveling environment information, and when the target acceleration rate of the own vehicle is set for each of the curves, the acceleration and deceleration controller controls the acceleration and the deceleration on a basis of a minimum target acceleration rate of the plurality of set target acceleration rates.

2. The vehicle traveling control apparatus according to claim 1, wherein, when the steering holding state detector detects that the driver does not hold the steering wheel, the target parameter correcting unit corrects the target parameter to a value lower than the target parameter to be set on a condition that the steering holding state detector detects that the driver holds the steering wheel.

3. A vehicle traveling control apparatus comprising:
    a steering holding state detector that detects a steering wheel holding state of a driver, on a condition that the vehicle traveling control apparatus performs to an own vehicle an automatic driving control on the basis of traveling environment information on a traveling environment in which the own vehicle travels and traveling information of the own vehicle;
    a target parameter setting unit that recognizes a curve to be traveled ahead of the own vehicle on a basis of the traveling environment information, and sets a target parameter that is one or both of a target vehicle speed and allowable lateral acceleration rate of the own vehicle in passing through the curve ahead of the own vehicle;

a target parameter correcting unit that corrects the target parameter set by the target parameter setting unit depending on the steering wheel holding state of the driver; and an acceleration and deceleration controller that sets a target acceleration rate of the own vehicle on a basis of the corrected target parameter and controls acceleration and deceleration, and wherein, when a plurality of curves to be traveled ahead of the own vehicle are recognized on the basis of the traveling environment information, and when the target acceleration rate of the own vehicle is set for each of the curves, the acceleration and deceleration controller controls the acceleration and the deceleration on a basis of a minimum target acceleration rate of the plurality of set target acceleration rates.

4. The vehicle traveling control apparatus according to claim 3, wherein, when the steering holding state detector detects that the driver does not hold the steering wheel, the target parameter correcting unit corrects the target parameter to a value lower than the target parameter to be set on a condition that the steering holding state detector detects that the driver holds the steering wheel.

\* \* \* \* \*